(12) United States Patent
Birkner

(10) Patent No.: US 8,690,100 B2
(45) Date of Patent: Apr. 8, 2014

(54) GYROPLANE

(75) Inventor: Otmar Birkner, Hildesheim (DE)

(73) Assignee: AutoGyro AG, Kloten (CH)

( * ) Notice: Subject to any disclaimer, the term of this patent is extended or adjusted under 35 U.S.C. 154(b) by 15 days.

(21) Appl. No.: 13/393,909

(22) PCT Filed: Sep. 2, 2010

(86) PCT No.: PCT/DE2010/001043
§ 371 (c)(1),
(2), (4) Date: Apr. 5, 2012

(87) PCT Pub. No.: WO2011/026478
PCT Pub. Date: Mar. 10, 2011

(65) Prior Publication Data
US 2012/0181378 A1  Jul. 19, 2012

(30) Foreign Application Priority Data

Sep. 4, 2009 (DE) .......................... 10 2009 040 278

(51) Int. Cl.
*B64C 27/00* (2006.01)
(52) U.S. Cl.
USPC ........................................ 244/60; 244/17.11
(58) Field of Classification Search
USPC ............... 244/17.11, 8, 17.25, 60; 192/85.49, 192/85.53
See application file for complete search history.

(56) References Cited

U.S. PATENT DOCUMENTS

| | | | |
|---|---|---|---|
| 2,712,911 A * | 7/1955 | Herrick | 244/7 A |
| 4,458,860 A * | 7/1984 | Ogawa | 244/17.11 |
| 5,544,844 A | 8/1996 | Groen et al. | |
| 6,062,508 A * | 5/2000 | Black | 244/8 |
| 6,077,041 A * | 6/2000 | Carter, Jr. | 416/169 R |
| 6,116,399 A * | 9/2000 | Drexl et al. | 192/85.52 |
| 7,178,757 B1 * | 2/2007 | Breese et al. | 244/8 |
| 7,448,571 B1 | 11/2008 | Carter, Jr. et al. | |
| 2001/0037927 A1 * | 11/2001 | Nagler et al. | 192/85 R |
| 2006/0269413 A1 * | 11/2006 | Cotton et al. | 416/170 R |
| 2009/0008497 A1 * | 1/2009 | Corsiglia et al. | 244/17.11 |
| 2012/0104153 A1 * | 5/2012 | van der Westhuizen | 244/17.11 |

FOREIGN PATENT DOCUMENTS

| | | |
|---|---|---|
| DE | 102007004168 | 8/2007 |
| DE | 102007032488 | 2/2008 |
| EP | 1 482 194 | 12/2004 |
| FR | 724 461 | 4/1932 |
| FR | 724461 | 4/1932 |

* cited by examiner

*Primary Examiner* — Tien Dinh
*Assistant Examiner* — Jessica Wong
(74) *Attorney, Agent, or Firm* — Whitham, Curtis, Christofferson & Cook, P.C.

(57) ABSTRACT

A gyrocopter includes a motor, a rotor head and a torque transmission device for transmitting torque of the motor to the rotor head. The torque transmission device includes a pneumatic coupling.

5 Claims, 8 Drawing Sheets

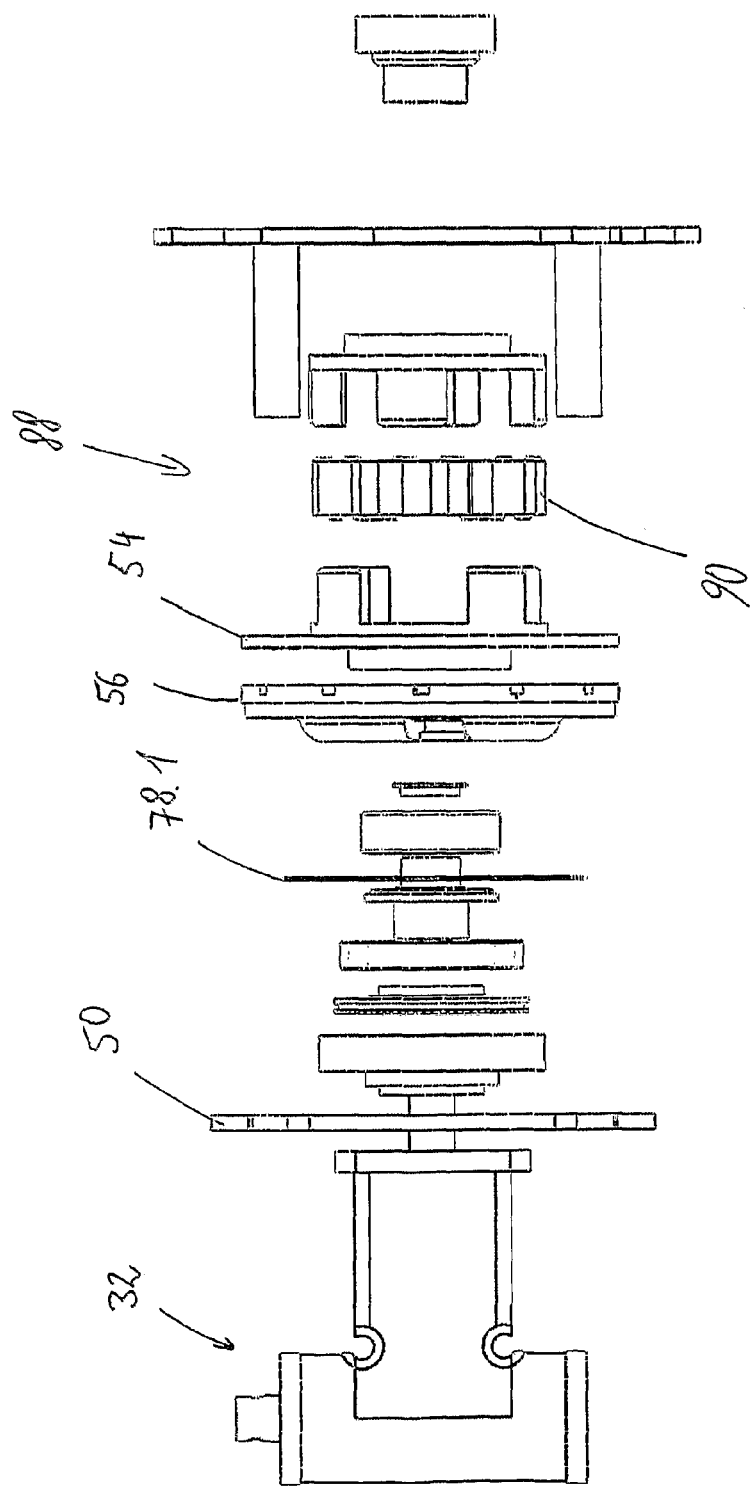

GYROPLANE

FIELD OF THE INVENTION

The invention relates to a gyrocopter comprising a motor, a motor head and a torque transmission device for transmitting torque of a motor to the rotor head.

BACKGROUND

As with all aircrafts, the aim of gyrocopters is also to have as light a construction as possible. This is especially important with gyrocopters because, in order to be approved as sport aircraft, the mass must not exceed 450 kg. Thus the goal is to construct a particularly light weight torque transmission device. However, to this effect, there are already limits on current gyrocopters which state that the torque transmission device must be designed in such a way that it withstands torque peaks. Such torque peaks can, for example, occur at the start of a pre-rotation if the pilot accelerates too early.

In U.S. Pat. No. 5,544,844 a gyrocopter is described which has a hydraulically operated coupling. With this hydraulically operated coupling, oil pressure is built up by means of a lever. This is then directed to the coupling and causes the switching procedure. With this gyrocopter there is also the problem that the pilot can engage the coupling too quickly so that the torque transmission device behind the coupling is overworked. In order to avoid this, the torque transmission device must be oversized, as described above.

In U.S. Pat. No. 6,062,508 an aircraft is described which has a main rotor for taking off and landing, as well as wings for cruising flight. For the switching of the motor from the main rotor to a propeller a multi-plate coupling is provided. For a combination aircraft of this type, enough power must be transmitted to the main rotor so that a sufficiently large lift can be generated for the aircraft to take off. This requires a high-powered motor and a powerful torque transmission device. The requirements for an aircraft according to this document are therefore not comparable with the requirements for a gyrocopter. In particular, the fact that a torque transmission device must be oversized is not a problem with combination aircrafts, as such large amounts of power must be transmitted when taking off that peak power outputs created when engaging the coupling can be intercepted without any further measures.

In U.S. Pat. No. 7,448,571 B1 a gyrocopter is described which has a bracket, under which the rotor blades of the main rotor are oriented, that is automatically adjusted. The exact arrangement of the coupling is not described further in the printed description.

In U.S. Pat. No. 2,712,911 a combination aircraft is described which can be driven as a fixed wing aircraft as well as a rotary wing aircraft, and has a magnetic coupling. It has emerged that magnetic couplings of this sort are unsuitable for use in gyrocopters, as the generator needed for the creation of the necessary currents creates a large additional weight.

In DE 10 2007 004 168 A1 and DE 10 2007 032 488 A1 pneumatic couplings for land vehicles are described.

SUMMARY

The purpose of the invention is to specify a gyrocopter with which the overworking of a torque transmission device during pre-rotation is avoided and which is simultaneously lightweight.

The invention solves the problem by means of a gyrocopter according to the preamble of claim 1 whose torque transmission device has a pneumatic coupling.

The solution according to the invention has the advantage that the coupling can be formed in such a way that a maximum torque is not exceeded whilst engaging the coupling. For this reason the powertrain can be constructed in such a way that it does indeed transmit this predefined maximum torque, but not considerably larger torques. However, since the torque transmission device does not have to be constructed for any possible operating error made by the pilot, it can be made more lightweight.

A further advantage is that damages caused by operating errors in the powertrain can be avoided. This increases the operational reliability and availability of the gyrocopter.

A further advantage is that the coupling performance of the gyrocopter is independent from environmental conditions. With known couplings which comprise a belt drive, the static friction coefficient and the coefficient of sliding friction decrease when humidity increases. If the belt drive has got wet, slippage can occur particularly easily. As substantial power must be transmitted via the coupling, slippage causes considerable wearing of the belt. In contrast to this the pneumatic coupling can be constructed as a dry friction coupling which is essentially maintenance free.

A further advantage is that the coupling can be arranged in such a way that an input part and an output part of the coupling run coaxial to one another and to a crankshaft of the motor. In this way, no significant shift of the motor relative to the fuselage of the gyrocopter can occur during pre-rotation by means of the torque. For this reason, a seat for the motor can be made to be less inflexible, which saves additional weight.

In the prior art electric couplings are described which shift via a magnetic field. However, it has emerged that electric couplings are less suitable for gyrocopters because, amongst other things, substantial torques of approximately 35 Newton meters must be transmitted during longer pre-rotation. This leads to a thermal expansion of the friction lining and requires an increased travel range, which then requires a large electric current to close the coupling. Although an electric coupling thus appears to be advantageous due to the simple steering, the specifics of the gyrocopter lead to serious disadvantages which make such an application unattractive.

Within the present description the motor is specifically a cylinder motor.

The term rotor head refers in particular to the unit of the gyrocopter which joins the rotor with the fixed fuselage. In other words, the rotor head is the component upon which the rotor is fixed and by which the rotor can be pivoted relative to the fuselage.

The term torque transmission device refers in particular to the entity comprised of those components which are arranged in a torque flow behind the motor and in front of the rotor head. Should the rotor head have a sprocket wheel which is driven by a pinion, the torque transmission device terminates with the pinion.

According to a preferred embodiment, the coupling is a dry friction coupling. This type of dry friction coupling has two friction partners which can be meshed and separated, in that they are positioned on one another. Between the two friction partners there is no liquid present so that stick-slip effects exist only on a small scale. The friction partners are preferably protected from the entrance of moisture by means of a housing unit.

It is beneficial for at least one of the two friction partners to be grooved, especially radially grooved, so that frictional heat can be particularly well discharged.

According to a preferred model, the pneumatic coupling comprises an input shaft, an output shaft and a pneumatic cylinder, whereby the pneumatic cylinder radially surrounds the input shaft and/or the output shaft. Here, the term pneumatic cylinder refers to the entire component comprising a cylinder and a piston. The term cylinder, however, refers to the cylindrical cavity in which the piston runs. The advantage of this construction is that it is especially space-saving.

The pneumatic cylinder preferably has a ring-shaped cross section. In this way the pneumatic coupling is particularly quick and compact and comes with a small number of components. The cylinder can also be described as an axially hollow-bored cylinder.

The pneumatic coupling preferably has a thrust bearing which has a primary bearing ring that has a torsionally rigid connection with the pneumatic cylinder, and a secondary bearing ring which is arranged so that it can be rotated relative to the pneumatic cylinder. To this effect the primary bearing ring is preferably connected to the piston of the pneumatic cylinder. A thrust bearing is a rolling bearing which is designed to transmit axial power. The thrust bearing preferably transmits the full axial charge created by the pneumatic cylinder.

The gyrocopter preferably has a powertrain whereby the input shaft is part of the powertrain, as well as a power output train whereby the output shaft is part of the power output train. The coupling preferably has a release spring which is arranged to transmit a torque in the torque flow between the powertrain and the power output chain. The term release spring refers particularly to a spring which allows an axial movement of at least one part of the powertrain to at least one part of the output chain. The release spring thus allows for the transmission of a load torque from the motor to the rotor and simultaneously the movement of two parts of the powertrain and output chain relative to one another. In this way a frictional connection between two components of the coupling can be produced.

It is especially beneficial if the release spring preloads the pneumatic cylinder when it is in its neutral position. Preferably, the neutral position refers to the position of the pneumatic cylinder in which it has minimal expansion or length. In this position, a piston of the pneumatic cylinder, which runs inside the cylinder, generally fits onto the front end, i.e. on the head of the cylinder. For safety reasons it is intended that the coupling does not transmit any torque in this position. Should the compressed air supply then fail during flight, the rotor cannot be braked.

The pneumatic coupling preferably has a friction lining and an anchor plate, whereby the release spring is designed in such a way that the friction lining and the anchor plate have a neutral distance of at least 0.5 millimeters when there is no pressure on the pneumatic cylinder. This leads to an especially high level of operational safety because it ensures that any thermal expansion of the coupling components, for example as a result of motor heat or exposure to the sun, does not cause an unintended closure of the coupling.

The pneumatic cylinder preferably has a stoke of at least 2 millimeters. This allows for a friction lining with a thickness of at least 2 millimeters. At the beginning of pre-rotation a relatively high torque of, for example, 35 Newton meters must be transmitted for a high output of, for example, 80 kW, if applicable. This leads to a high thermal load on the friction lining and thus to a high level of wear, particularly with a slipping coupling at the beginning of pre-rotation. As a result of the large stroke, which is possible to have when using a pneumatic cylinder, the pneumatic coupling has a longer operating life.

It is preferable for the pneumatic cylinder to be arranged so that it is directly effective. This means that the piston of the pneumatic cylinder is arranged in such a way that a movement of the piston around a fixed stroke causes a change in distance between the friction lining and anchor plate around precisely this stroke. This saves using levers and leads to a particularly robust and simultaneously light pneumatic coupling.

The coupling can sometimes be engaged too quickly, particularly by inexperienced pilots. This causes torque peaks in the powertrain between the motor and the rotor head, which leads to damages if the powertrain is not constructed in a sufficiently stable way. In order to capture torque peaks safely, in conventional gyrocopters a heavy powertrain is necessary. According to a preferred model the pneumatic coupling includes a compressed air feed to the pneumatic cylinder, which comprises a throttle. The compressed air feed preferably has a throttling entry valve, in particular a non-return throttling entry valve.

The throttle, the throttling entry valve or the non-return throttle entry valve are designed in such a way that a sudden application of nominal pressure on the compressed air feed causes a time lapse of at least 100 milliseconds when engaging the coupling, from the time of applying the nominal pressure until the transmission of the complete torque from the powertrain to the output chain. The time lapse when engaging the coupling is preferably 5 seconds. The engagement of the coupling is then enough to open an entry valve, particularly the throttle entry valve. During the time lapse when engaging the coupling the torque being transmitted preferably increases monotonously, especially strictly monotonously, so that the rotor comes up to speed. By controlling the engagement of the coupling, torque peaks are avoided so that all the components of the powertrain or output chain can be made to be lightweight.

The gyrocopter preferably has a mounting device for mounting the coupling, whereby the pneumatic cylinder is connected to the mounting device so that it is torsionally rigid. This has the advantage that the compressed air can be directed by means of a pipe which does not have to rotate.

The coupling preferably has a slipping torque which is smaller than a maximum transmittable torque of the components arranged in the torque flow behind the coupling. Should it occur that too large a torque from the motor is applied to the drive side, for example as a result of an error made by the pilot, the pneumatic coupling will begin to slip before a torque is reached, which could lead to damage of the components of the output chain. This increases the operational safety and robustness of the gyrocopter.

The coupling is preferably arranged coaxial to a crank shaft of the motor. This has the advantage that during pre-rotation, operating torques only cause a shift in the motor relative to the fuselage. This means that the motor mount does not warp relative to the fuselage and can therefore be made to be softer, thus making it more lightweight.

The gyrocopter preferably has a correcting device arranged in the torque flow between the input and output shaft. This correcting device preferably has a stiffness, particularly an axial stiffness and/or a torsional stiffness, in an axial direction which is equal to, at the most, one fifth of the stiffness of the remaining components of the torque transmission device. In particular, the correcting device is arranged and designed in such a way that a thermal heating of the input shaft and/or the output shaft, for example, to 90° C., causes an axial force on the input shaft which is smaller than a predefined maximum force of 100 N, for example.

According to a preferred model, the gyrocopter has a correcting device arranged in the torque flow between the input and output shaft which comprises a rubbery-elastic correcting component. This correcting component is arranged in such a way that it becomes distorted during a thermal expansion of correcting device of the input and /or output shaft, so that an axial force is restricted to one or several bearings of the input shaft.

The correcting component preferably has a torsional stiffness which is smaller than the torsional stiffness' of all the other elements of the torque transmission device. For example the torsional stiffness is equal to at the most one fifth of the torsional stiffness of the element with the next smallest torsional stiffness. In this way the varying torque of the motor, which is for the most part a cylinder motor, is evened out, which is beneficial for the rotor head. It is possible that the correcting element has an axial stiffness, additionally or alternatively, as described above.

The torque transmission device preferably comprises an angular gearbox that is arranged in the torque flow behind the coupling.

The torque transmission device preferably comprises a universal joint that is arranged in the torque flow behind the angular gearbox. It should be arranged in such a way that it compensates the movement of the motor that is caused by the torque the motor exerts on the powertrain. By this, it can be understood that an elastic distortion of the mounting carried by the motor or parts of the fuselage, upon which the motor is fixed, is compensated by the universal joint relative to the remaining elements of the powertrain or torque transmission device. In this way it is possible to install the elements which fix the motor to the fuselage in a more yielding way so that they can be made to be more lightweight. If a torque is exerted on the torque transmission device during pre-rotation, the fuselage will warp relative to the torque transmission device, thus only as far as the universal joint.

The universal joint can be constructed in such a way that it balances a variable angle between both shafts connected by the universal joint. The universal joint is constructed alternatively or additionally in order to balance out a movement of the shafts along or against their longitudinal axis.

The universal joint is preferably arranged at the height of the propeller pivot. This can be understood to mean that the universal joint is at the most a minor distance from the propeller pivot, in particular a distance of less than 40 cm.

DESCRIPTION OF THE DRAWINGS

In the following section the invention is clarified in more detail by means of an example. It shows FIG. 1 a gyrocopter according to the invention from a side-on view, FIG. 2 an element of the gyrocopter according to FIG. 1 with the torque transmission device, FIG. 3 an exploded view of the pneumatic coupling of the torque transmission device from a side-on view, FIG. 4 the pneumatic coupling from a side-on sectional exploded view, FIG. 5 a sectional exploded view from underneath, FIG. 6 a sectional view of the pneumatic coupling, FIG. 7 an exploded view of a second model of a pneumatic coupling for a gyrocopter according to the invention, and FIG. 8 the coupling in FIG. 7 in a sectional exploded view.

DESCRIPTION

Figure 1:
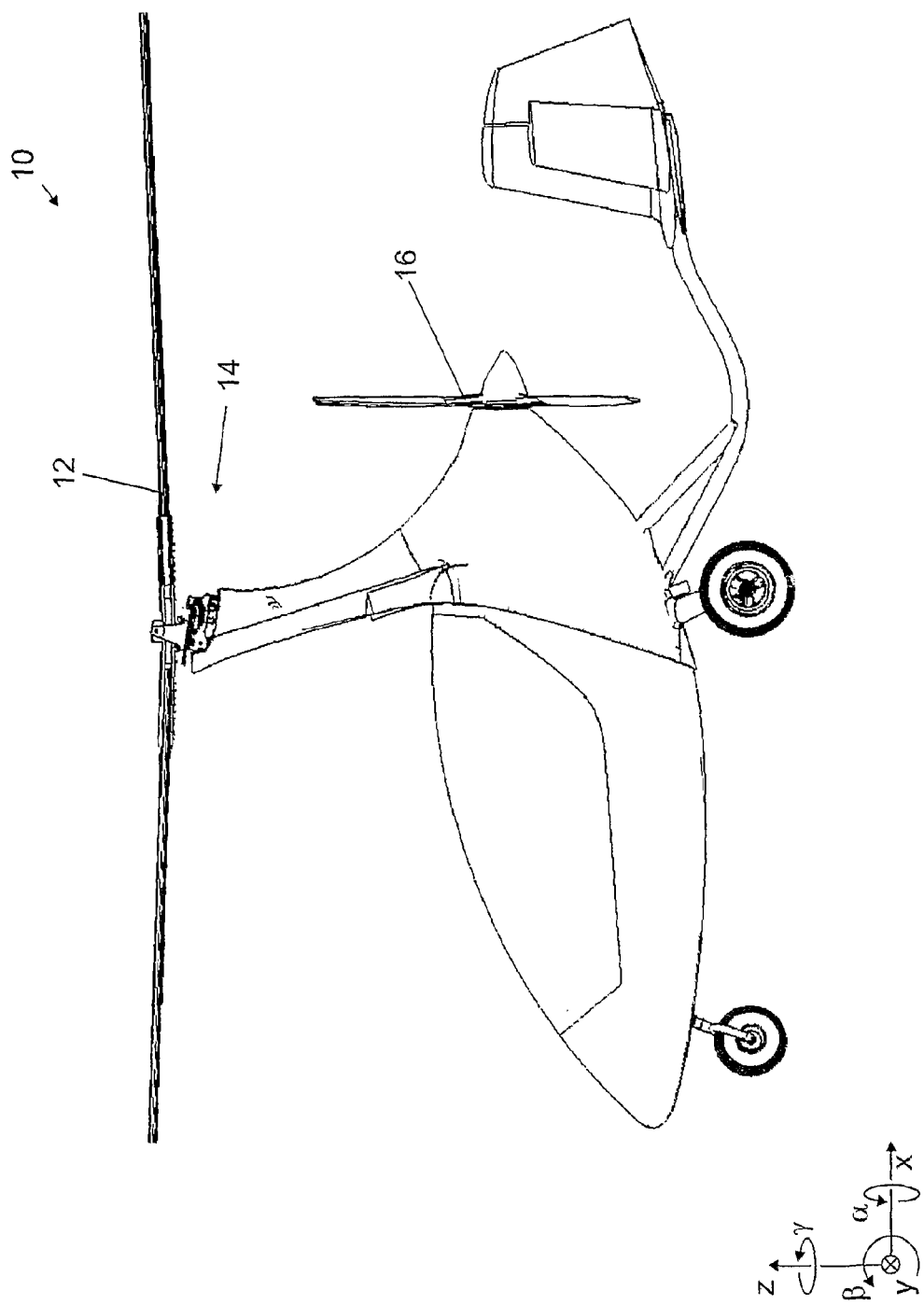

FIG. 1 shows a gyrocopter 10 according to the invention, which comprises a rotor 12 that is fixed onto a rotor head 14.

The rotor head 14 is driven by a motor not shown in FIG. 1 which is also intended to drive a propeller.

Figure 2:
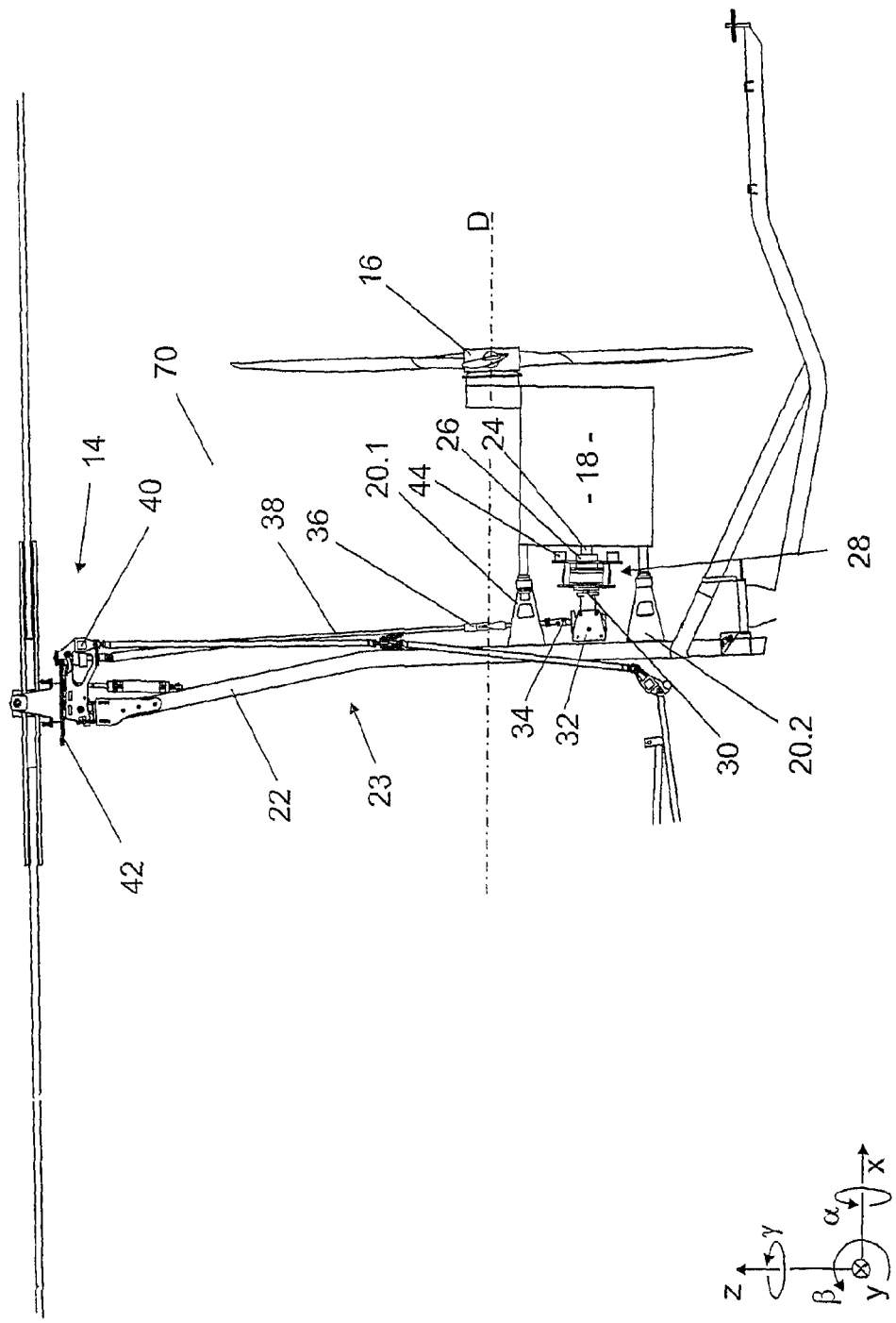

FIG. 2 shows the motor 18 in the form of a cylinder motor which is fixed to a support structure 22 of a fuselage 23 by two mountings 20.1, 20.2. The motor 18 comprises a crank shaft 24 which is connected to the input shaft 26 of a pneumatic coupling 28. An output shaft 30 of the pneumatic coupling 28 is connected to an angular gearbox 32. The angular gearbox 32 comprises an second output shaft 34 which is connected to a mast shaft 38 by means of a universal joint 36.

The angle between second output shaft 34 and output shaft 30 is between 80° and 100°. In the present case the angle is 90°. The mast shaft 38 ends with a pinion 40 which works in combination with a sprocket wheel 42 of the rotor head 14.

The propeller 16 has a propeller pivot D and the universal joint 36 is at the height of the propeller pivot D. It is also possible to arrange the universal joint D underneath or slightly above the propeller pivot D.

Figure 3:
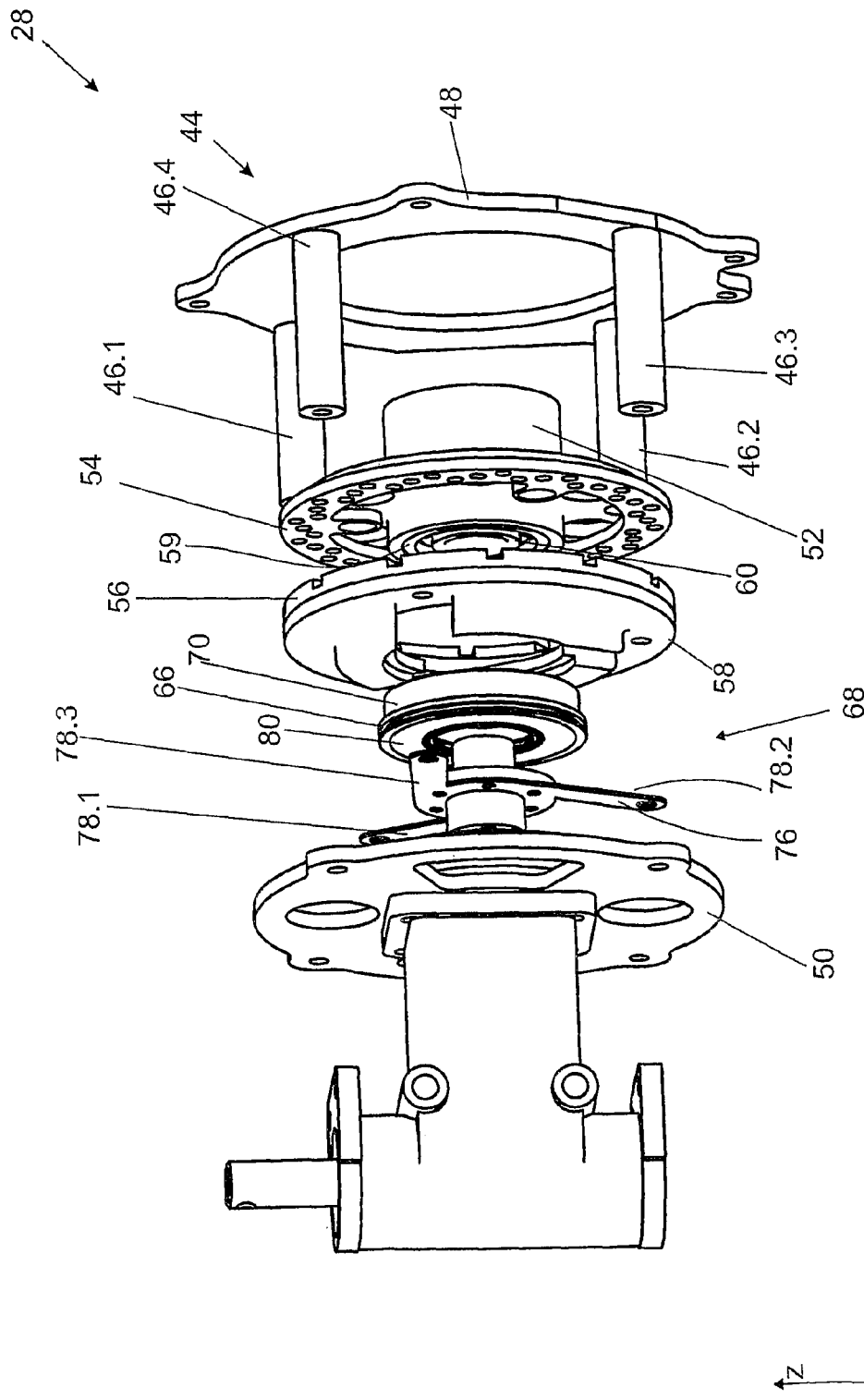

FIG. 3 shows an exploded view of the coupling 28. The pneumatic coupling 28 comprises a mounting device 44 which should be mounted on the fuselage 23 (FIG. 2). The mounting device 44 comprises four connecting components 46.1, 46.2, 46.3, 46.4 which are mounted on a base plate 48 and are connected with a front plate 50. Inside the connecting components 46 a driver 52 is arranged radially which meshes with the crank shaft 24 (FIG. 2) in the mounting position. The driver 52 comprises an anchor plate 54 which acts as a friction partner of a friction connection whereby the other friction partner is made up of a friction lining 56. The friction lining 56 is mounted on a friction lining support plate 58.

If the motor 18 (FIG. 2) is in operation, the driver 52 rotates and thus also the anchor plate 54. An axis centering device 60 is mounted on the driver 52 by means of a ball bearing 59 (cf. FIG. 5) into which the output shaft 30 runs and is thus embedded.

A cylinder housing 62 (FIG. 5) is fixed onto the front plate 50 with a cylinder 64. A torus-shaped piston 66 (FIG. 3) runs through the cylinder 64 which has a circular disc-shaped cross-section. The cylinder housing 62 and the piston 66 are part of the pneumatic cylinder 68.

A thrust bearing 70 is mounted on a piston 66 which comprises a primary bearing ring 72 (FIG. 5) and a secondary bearing ring 74. The primary bearing ring 72 is connected with the piston 66 so that it is torsionally rigid, whereas the secondary bearing ring is attached to the friction lining support plate 58 so that it is torsionally rigid.

A release spring 76 is fixed onto the axis centering device 60 which has arms 78.1, 78.2, 78.3 (FIG. 3). The release spring 76 is fixed, for example with screws, onto the friction lining support plate 58 at the end of the arms 78. The holes for the screw connections for the arms 78.2 and 78.3 in the friction lining support plate 58 can be seen in FIG. 3.

In a disengaged state the motor drives the driver 52 and thus the anchor plate 54. All remaining elements of the coupling do not rotate. The piston 66 is arranged with its front end 80 (FIG. 3), which has a circular groove, in the cylinder 64, to the left in FIG. 5.

Figure 5:
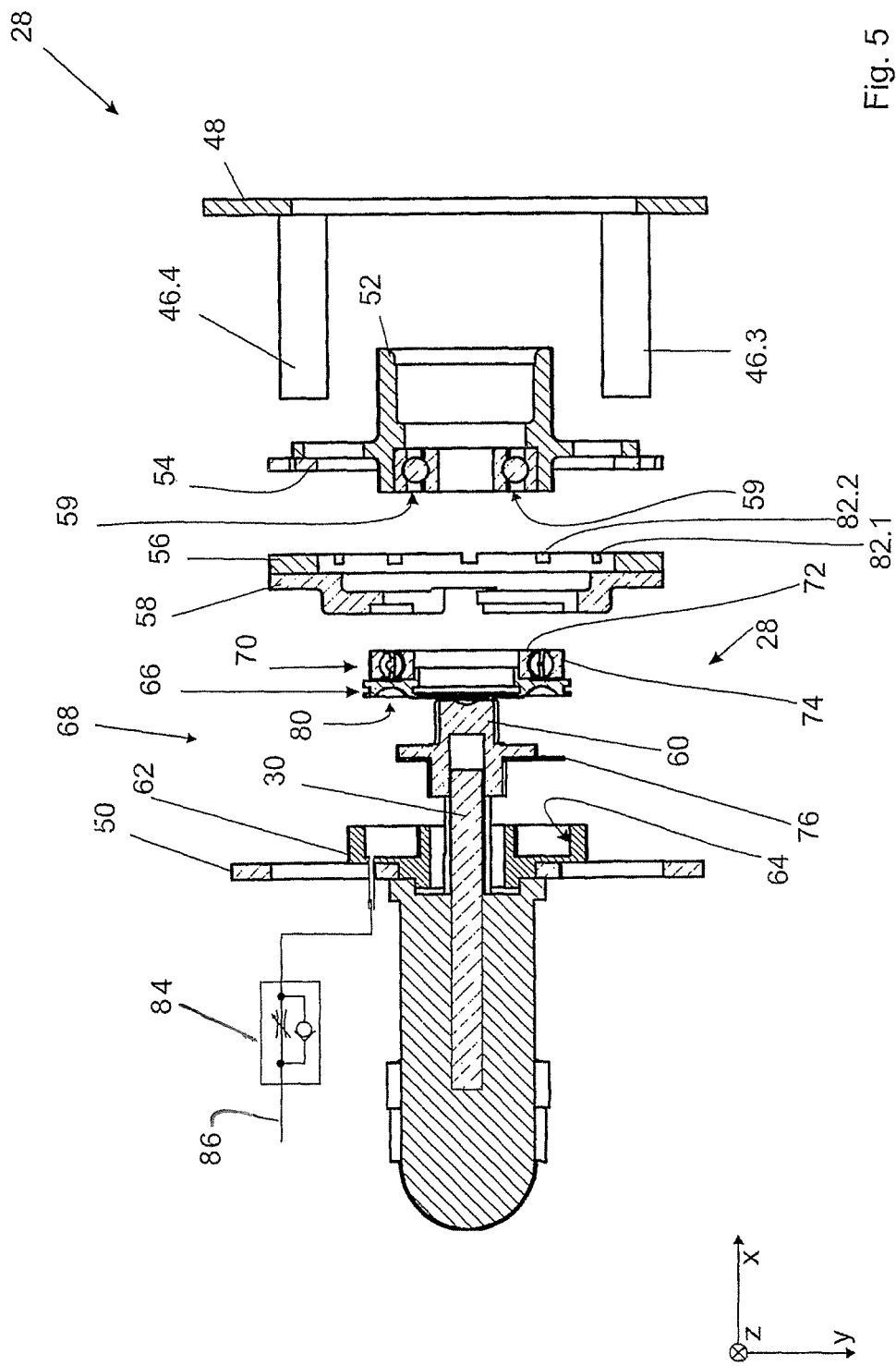
Figure 6:
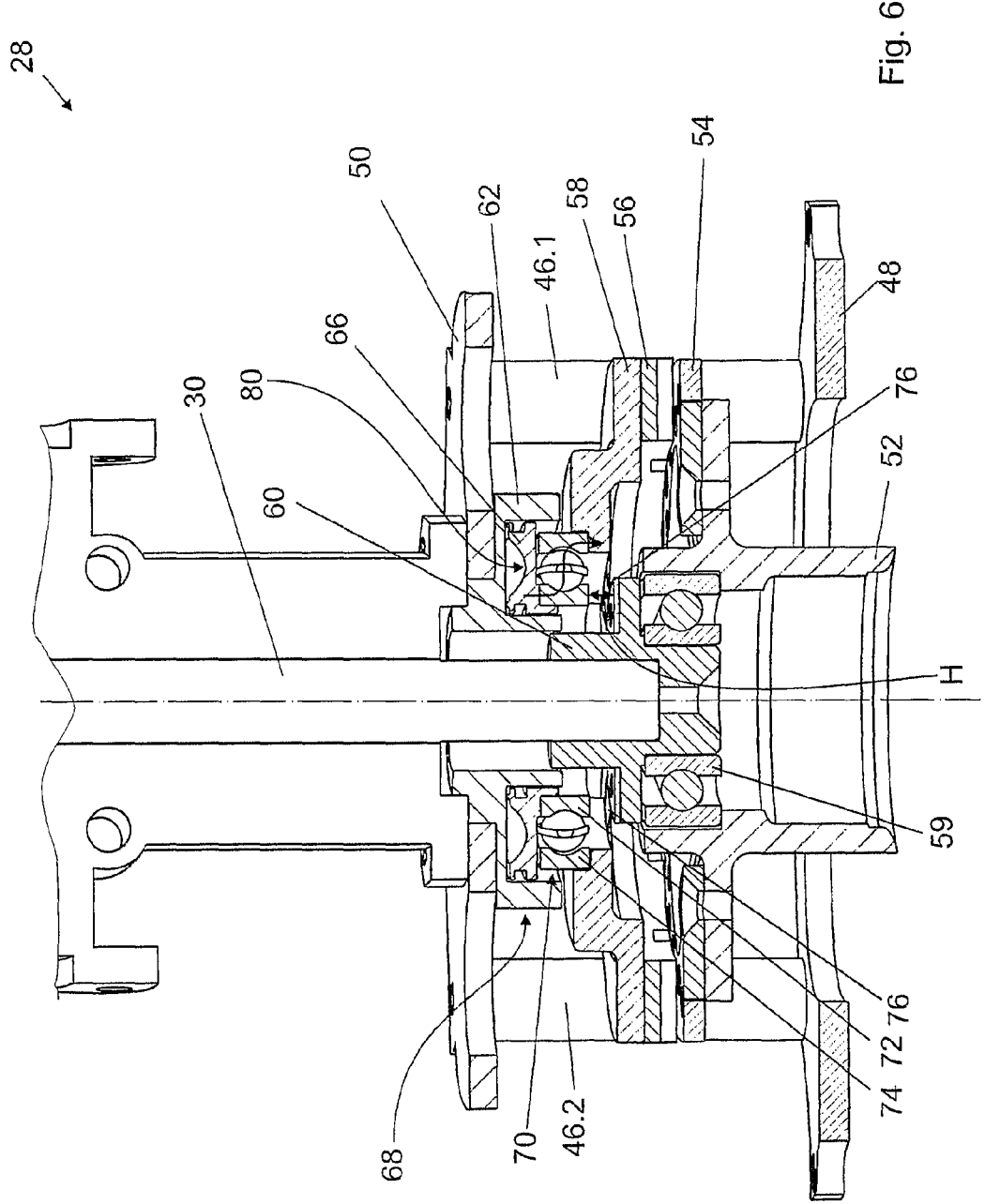

Should the pressure in the cylinder 64 increase, the piston 66 will move from this neutral position against the force of the release spring 76 in FIG. 5 to the right, along a stroke H, i.e. a distance H. In this way the thrust bearing 70 and the friction lining support plate 58 will also move on the anchor plate 54 until a frictional connection occurs between the friction lining 56 and the anchor plate 54.

The frictional connection makes the friction lining support plate 58 rotate together with the secondary bearing ring 74 of the thrust bearing 60. However, the piston 66 does not rotate.

Since the arms 78.1, 78.2, 78.3 are fixed onto the friction lining support plate 58, the axis centering device 60 also rotates, and thus the output shaft 30 which is connected to be torsionally rigid with the axis centering device 60. Should the pressure in the cylinder 64 decrease, the release spring 76 pushes the piston 66 back into its neutral position and the friction lining 56 is separated from the anchor plate.

Figure 4:
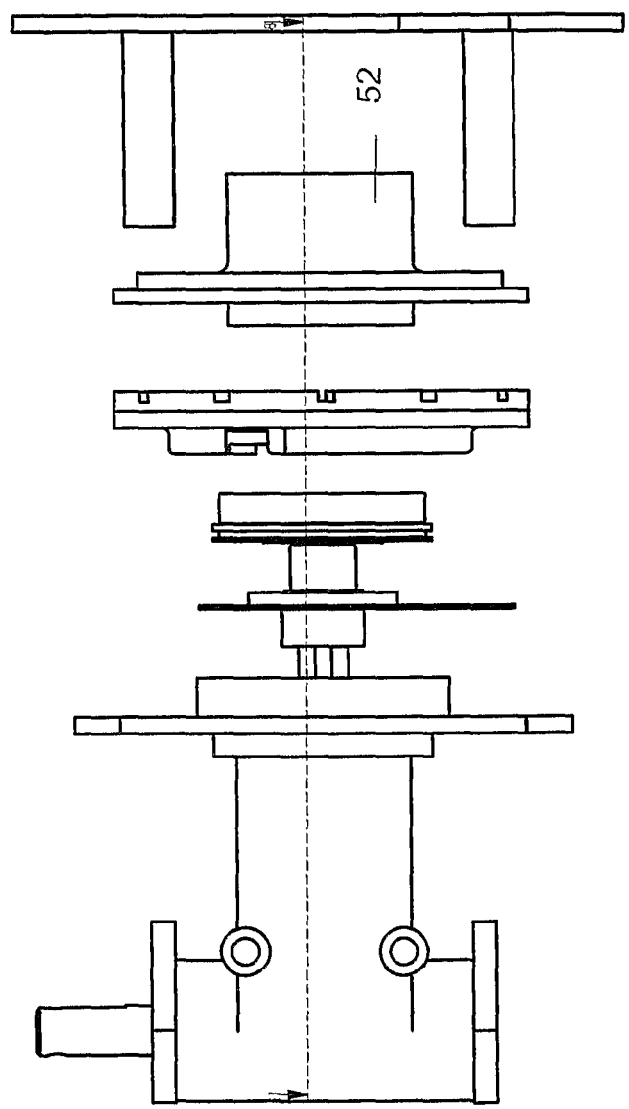

The FIGS. 3, 4 and 5 could give the impression that the connecting components 46 are in contact with one of the rotating components. However, they are only connected to the front plate 50 and the friction lining support plate 58 and the anchor plate 54, for example, freely rotate radially inside the connecting components 46.

The friction lining 54 has a number of grooves 82.1, 82.2, .... The grooves 82 run radially outwards and run through the entire friction lining 54. In this way, during engagement of the coupling the friction lining 54 is cooled by an air stream, which is produced by the centrifugal force. The anchor plate 54 is perforated which improves the cooling of the anchor plate 54.

The pneumatic cylinder 68 is connected to a compressed air supply—not shown in the diagrams—of, for example, 8 bars by means of a schematically drawn throttle entry valve 84 and a compressed air connection 86. The throttle entry valve 84 is used by means of an electric or mechanic operating device from the cockpit of the gyrocopter.

Figure 7:
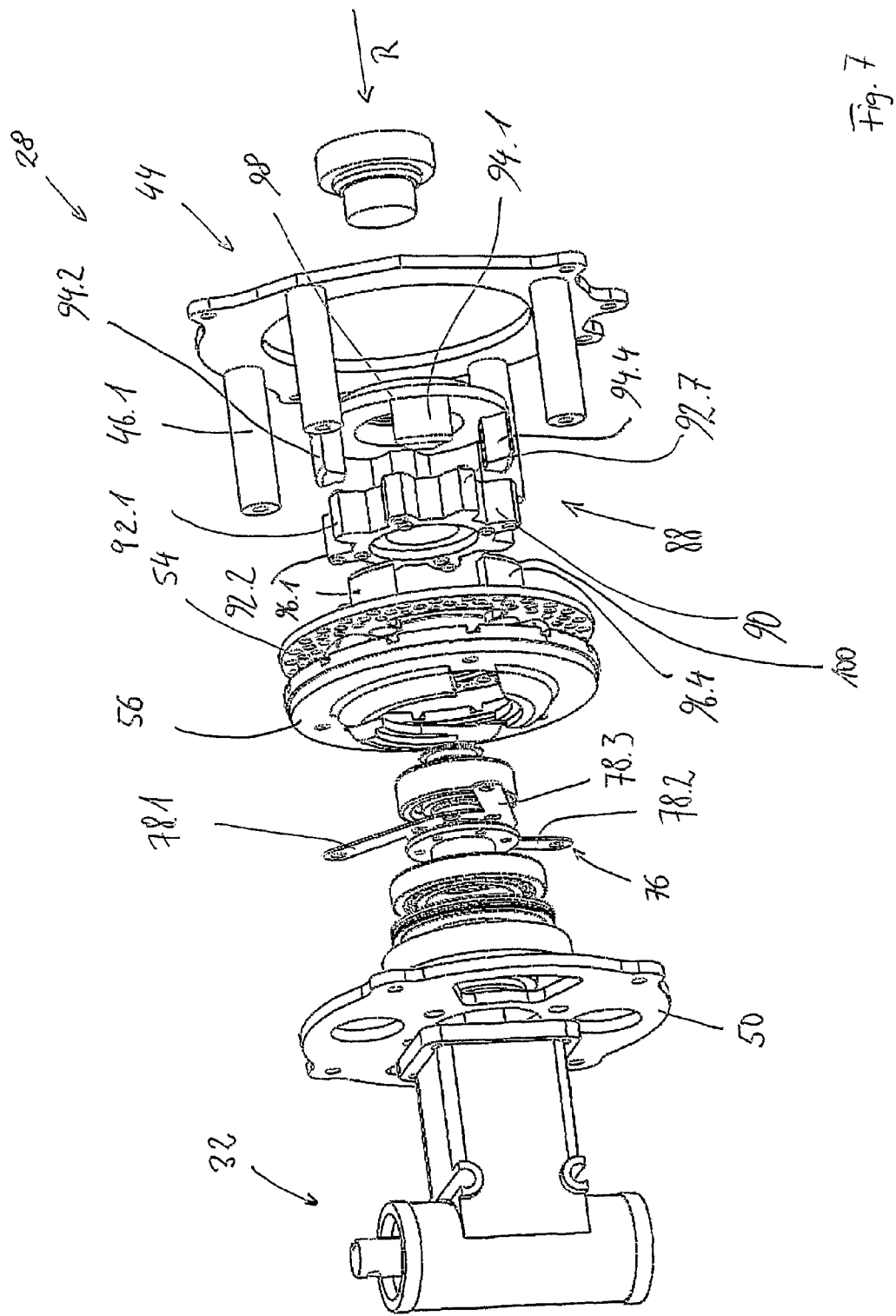

FIG. 7 shows an exploded view of a pneumatic coupling for a gyrocopter according to the invention. It should be recognized that the coupling 28 has a correcting component 88 which is arranged in the torque flow behind the motor and in front of the anchor plate 54 in the present case. The correcting component 88 is designed for the absorption of axial forces which are the result of a thermal expansion of the input shaft. In this way, it is possible to avoid an excessive burden on the input shaft bearings.

In the preferred model according to FIG. 7 the correcting device 88 comprises a correcting component 90 made from a rubbery-elastic material, for example rubber. Fundamentally, every suitable shape is possible for the correcting component, but it is especially beneficial if the correcting component 90 has protrusions 92.1, 92.2, as in the present case, which work in combination with primary coupling protrusions 94.1, 94.2, . . . of a primary coupling component 98, and secondary coupling protrusions 96.1, . . . , 96.4 of a secondary coupling component 100. The coupling component 98, 100 and the correcting component 90 are designed in such a way that a protrusion 92 of the correcting component 90 is arranged between a primary protrusion 94 and a secondary protrusion 96. The torque flow passes from a primary protrusion 94 through a sprocket 92 of the correcting component 90 and into a secondary protrusion 96. This evens out the varying torque due to the ignition of the cylinder motor.

Furthermore, the correcting component 90 is arranged between a primary coupling component 98, upon which the primary protrusions 94 are formed, and a secondary coupling component 100, upon which the secondary protrusions 96 are formed. It is arranged in such a way that an axial force acting in the axial direction R compresses the correcting component 90, so that the axial force which acts upon a bearing of the input shaft—not shown in the diagrams—is also limited to a value of less than a maximum permitted axial force during a thermal expansion of the input shaft.

FIG. 8 shows the coupling from FIG. 7 in a cross-sectional exploded view.

| Reference list | |
|---|---|
| 10 | gyrocopter |
| 12 | Rotor |
| 14 | Rotor head |
| 16 | Propeller |
| 18 | Motor |
| 20 | Mounting |
| 22 | Support structure |
| 23 | Fuselage |
| 24 | Crank shaft |
| 26 | Input shaft |
| 28 | Coupling |
| 30 | Output shaft |
| 32 | Angular motor |
| 34 | Second output shaft |
| 36 | Universal joint |
| 38 | Mast shaft |
| 40 | Sprocket |
| 42 | Sprocket wheel |
| 44 | Mounting device |
| 48 | Base plate |
| 50 | Front plate |
| 52 | Driver |
| 54 | Anchor plate |
| 56 | Friction lining |
| 58 | Friction lining support plate |
| 59 | Ball bearing |
| 60 | Axis centering device |
| 62 | Cylinder housing |
| 64 | Cylinder |
| 66 | Piston |
| 68 | Pneumatic cylinder |
| 70 | Thrust bearing |
| 72 | Primary bearing ring |
| 74 | Secondary bearing ring |
| 76 | Release spring |
| 78 | Arm |
| 80 | Front end |
| 82 | Groove |
| 84 | Throttle entry valve |
| 86 | Compressed air supply |
| 88 | Correcting device |
| 90 | Correcting component |
| 92 | Protrusion |
| 94 | Primary coupling protrusion |
| 96 | Secondary coupling protrusion |
| 98 | Primary coupling component |
| 100 | Secondary coupling component |
| D | Propeller pivot |
| H | Stroke |
| R | Axial direction |

The invention claimed is:

1. A gyrocopter, comprising
a motor;
a rotor head;
a torque transmission device for transmitting torque of the motor to the rotor head, the torque transmission device having a pneumatic coupling having an input shaft, an output shaft, and a pneumatic cylinder which radially surrounds the output shaft and/or the input shaft;
a powertrain comprising the input shaft; and
an output chain comprising the output shaft;
wherein said pneumatic cylinder radially surrounds the output shaft and/or the input shaft;
wherein the pneumatic coupling comprises a release spring arranged in a torque flow between the powertrain and the output chain for a transmission of torque; and
wherein the release spring preloads the pneumatic cylinder when the pneumatic cylinder is in a neutral position.

2. A gyrocopter, comprising
a motor;
a rotor head;

a torque transmission device for transmitting torque of the motor to the rotor head, the torque transmission device having a pneumatic coupling having an input shaft, an output shaft, and a pneumatic cylinder which radially surrounds the output shaft and/or the input shaft;

a powertrain comprising the input shaft; and an output chain comprising the output shaft;

wherein said pneumatic cylinder radially surrounds the output shaft and/or the input shaft;

wherein the pneumatic coupling comprises a release spring arranged in a torque flow between the powertrain and the output chain for a transmission of torque;

wherein the pneumatic coupling has a friction lining and an anchor plate; and wherein the release spring is configured such that the friction lining and the anchor plate have a neutral distance of at least 0.5 millimeters when the pneumatic cylinder is free from pressure.

3. A gyrocopter, comprising a motor;

a rotor head;

a torque transmission device for transmitting torque of the motor to the rotor head, the torque transmission device having a pneumatic coupling, wherein said pneumatic coupling has an input shaft, an output shaft, and a pneumatic cylinder which radially surrounds the output shaft and/or the input shaft; and a correcting device arranged in a torque flow between the input shaft and output shaft, the correcting device having a stiffness which is at most one fifth a stiffness of any remaining components of the torque transmission device.

4. A gyrocopter, comprising a motor;

a rotor head;

a torque transmission device for transmitting torque of the motor to the rotor head, the torque transmission device having a pneumatic coupling, wherein said pneumatic coupling has an input shaft, an output shaft, and a pneumatic cylinder which radially surrounds the output shaft and/or the input shaft; and a correcting device arranged in a torque flow between the input shaft and the output shaft, said correcting device comprising a rubbery-elastic correcting component.

5. The gyrocopter according to claim 3, wherein the stiffness of the correcting device is an axial stiffness and/or a torsional stiffness.

* * * * *